July 14, 1942.  F. W. BROOKE  2,290,031
PROTECTIVE DEVICE FOR ELECTRIC FURNACES
Filed March 1, 1941   2 Sheets-Sheet 1

INVENTOR
Frank W. Brooke

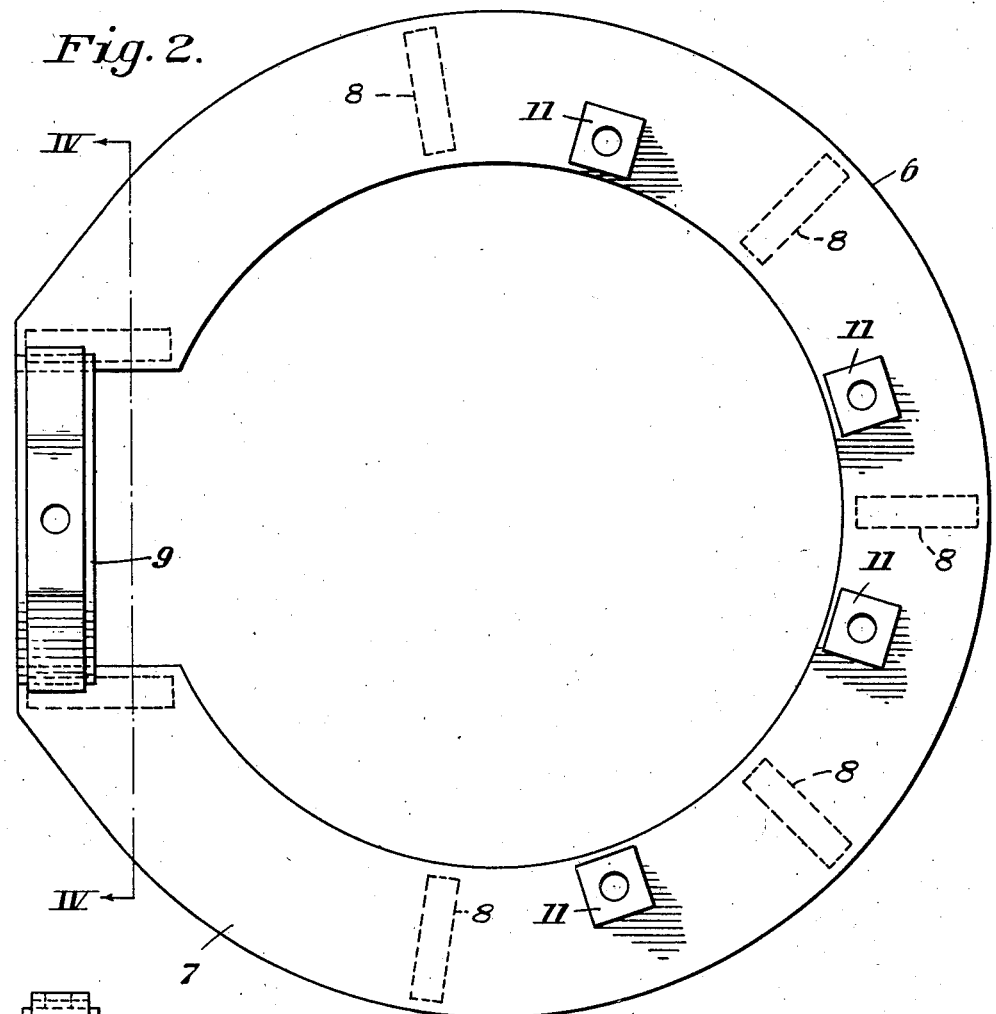
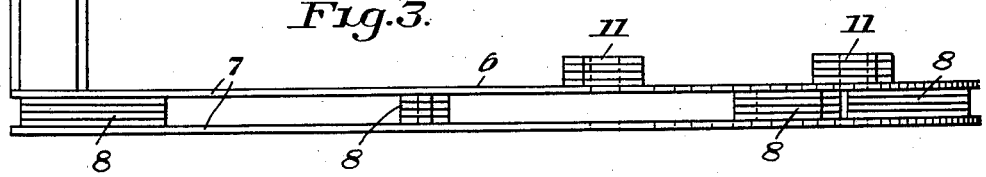
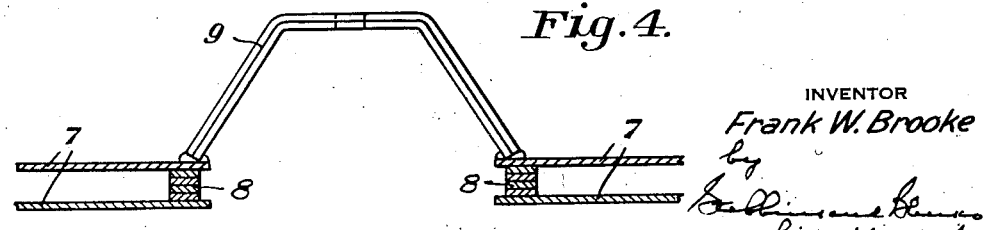

Patented July 14, 1942

2,290,031

UNITED STATES PATENT OFFICE 2,290,031

PROTECTIVE DEVICE FOR ELECTRIC FURNACES

Frank W. Brooke, Pittsburgh, Pa., assignor to Swindell-Dressler Corporation, Pittsburgh, Pa., a corporation of Pennsylvania Application March 1, 1941, Serial No. 381,279

3 Claims. (Cl. 13—15)

This invention relates to protective devices for electric furnaces and more particularly to devices for prolonging the life of the electrode holders which are situated in the zone of intense furnace heat.

The electrode holders in electric furnaces are closest of all of the operating parts to the zone of greatest heat in the furnace. They carry the electrodes which project directly into the interior of the furnace and heat passes to the electrode holders by radiation, convection and conduction. However, the amount of heat conducted to the holders through the electrodes is not alone sufficient to detrimentally affect them. Such amount of heat combined with the added heat which reaches the electrode holders by convection and radiation may, however, seriously affect a holder. The holders are commonly made of copper and if subjected to high temperatures for a sufficient period of time will oxidize at their contacting surfaces and will lose mechanical strength. The oxide formation greatly increases the electrical contact resistance of the holder to the electrode, thereby further raising the temperature of the holder so that conditions rapidly become worse. The loss of mechanical strength results in the formation of cracks within the holder, which lead to the early destruction thereof. Attempts have been made to correct these conditions by circulating cooling water through the electrode holders. While this expedient has somewhat reduced the destructive effects of the high temperatures, it has not of itself increased the useful life of the holders to the desired extent.

I provide for protecting the electrode holders from the heat of the furnace so that they can be relied upon to withstand any conditions to which they will normally be subjected in use. I preferably provide a protective device interposed between each electrode holder and the furnace which at least to a large extent intercepts the heat which tends to reach the electrode holder by radiation and convection. The protective device is preferably in the form of a shield substantially surrounding the electrode and it is preferably attached to the holder between the holder and the zone of greatest heat in the furnace. The protective device preferably comprises a plurality of heat resistant plates and such plates are preferably spaced apart to provide for air circulation therebetween and thereabout.

Other details, objects and advantages of the invention will become apparent as the following description of a present preferred embodiment thereof proceeds.

In the accompanying drawings I have shown a present preferred embodiment of the invention, in which Figure 1 is an elevational view showing an electrode holder with an electrode held therein and with a protective device applied thereto;

Figure 2 is a top plan view of the protective device;

Figure 3 is an elevational view of the protective device; and

Figure 4 is a fragmentary vertical cross-sectional view taken on the line IV—IV of Figure 2.

Figure 1:
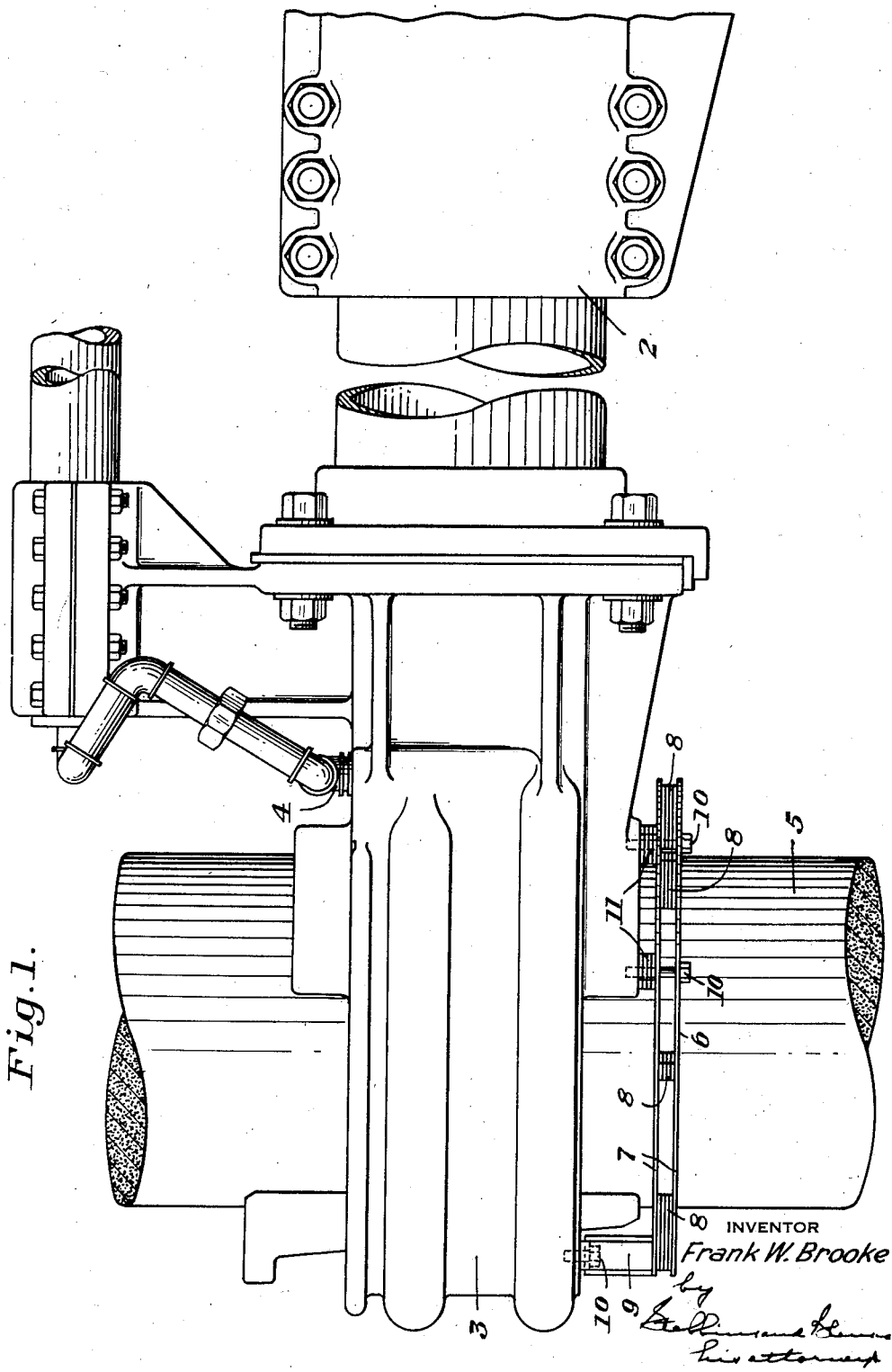

Referring now more particularly to the drawings, there is shown an electrode arm 2 adapted for the usual operative movements which carries at its extremity an electrode holder designated generally by reference numeral 3. The holder 3 is preferably made of copper and may be water cooled through connections 4. An electrode 5 is shown as being gripped or held by the holder 3. The specific structure of the holder per se forms no part of the present invention.

I provide a protective device or shield designated generally by reference numeral 6 and which is adapted to surround the electrode 5 and be interposed between the holder 3 and the zone of greatest heat of the furnace. The protective device 6 comprises a plurality of heat resistant plates 7 which may be of any suitable material, preferably heat resistant alloy steel. The plates proper are of generally horseshoe shape as shown in Figure 2. Spacers 8 are interposed between the plates 7 at intervals thereabout, the spacers comprising small pieces of heat resistant metal welded together. The spacers are preferably welded to the plates 7. At the ends of the plates 7 is a hanger 9 of generally inverted U shape which is welded to the plates as shown in Figure 4.

The protective device 6 is preferably removably connected with the holder 3. This may be accomplished by bolts 10 passing through the protective device and entering the holder. Five such bolts are shown, one passing through the hanger 9 and the other four passing through the body of the protective device. Spacers 11 are employed to space the protective device from the holder where the four last mentioned bolts are applied.

It frequently happens in electric furnace operation that flames will rise up from the interior of the furnace and impinge directly upon the electrode holders and burn them out. The protective device or shield above described prevents direct impingement of flames upon the holder and also intercepts and itself absorbs sufficient heat tending to be transferred to the holder by convection and radiation to insure that the holder will continue in service throughout its natural mechanical life. The spacing apart of the plates 7 and the spacing of the protective device from the holder allows for circulation of air between the protective device and the holder and between the plates of the protective device to dissipate heat absorbed by the protective device.

While the protective device is very simple in construction and application it serves its purpose remarkably well and results in a greater saving in electrode holders and extension of holder life.

While I have shown and described a present preferred embodiment of the invention it is to be distinctly understood that the invention is not limited thereto but may be otherwise variously embodied within the scope of the following claims.

I claim:

1. In an electric furnace, an electrode holder adapted to grip and move with an electrode and positioned in the heat zone of the furnace and a protective device for protecting the holder from the heat of the furnace, said device comprising a plurality of spaced apart heat resistant members interposed between the holder and the furnace body and spaced from the furnace body.

2. A protective device for electric furnaces comprising a shield adapted to substantially surround an electrode between the electrode holder and the furnace body and spaced from the furnace body, the shield comprising a plurality of heat resistant members and means connecting the heat resistant members in spaced apart relation.

3. A protective device for electric furnaces comprising a shield adapted to substantially surround an electrode between the electrode holder and the furnace body and spaced from the furnace body, the shield comprising a plurality of heat resistant plates, spacers between the plates to space them apart and means for fastening the spaced apart plates to the electrode holder.

FRANK W. BROOKE